United States Patent [19]

Smith

[11] Patent Number: 4,531,497
[45] Date of Patent: Jul. 30, 1985

[54] NATURAL GAS ADAPTOR SYSTEM FOR AUTOMOBILES

[75] Inventor: Robert W. Smith, Stouffville, Canada

[73] Assignee: Eneroil Research Ltd., Concord, Canada

[21] Appl. No.: 492,708

[22] Filed: May 9, 1982

[30] Foreign Application Priority Data

Oct. 4, 1982 [GB] United Kingdom ............... 8228259

[51] Int. Cl.³ .............................................. F02B 43/00
[52] U.S. Cl. .................................. 123/525; 123/575; 123/1 A
[58] Field of Search ............. 123/1 A, DIG. 12, 525, 123/527, 575

[56] References Cited

FOREIGN PATENT DOCUMENTS 1013632 1/1973 Canada ............................... 123/1 A
162226 12/1981 Japan .................................. 123/1 A

OTHER PUBLICATIONS

Compressed Natural Gas (CNG): A Vehicle Fuel for Utility Company Fleets–"The Pros and Cons"–Thompson et al., Feb. 1982, pp. 1–11.

*Primary Examiner*—E. Rollins Cross
*Attorney, Agent, or Firm*—Sim & McBurney

[57] ABSTRACT

There is provided a natural gas charging system for a vehicle which has an internal combustion engine adapted to run on gasoline or on natural gas, as well as a gasoline tank adapted to feed gasoline through a carburetor to the engine. The gas charging system includes storage means such as tanks which are adapted to store natural gas under a given storage pressure, and delivery means through which natural gas can be delivered from the storage means through an air-mixing means to the carburetor of the vehicle. A compressor is adapted to receive low-pressure natural gas and to compress it up to the storage pressure, and the engine is made to drive the compressor through drive means. Conduit means are provided from the output of the compressor to the storage means.

9 Claims, 2 Drawing Figures

NATURAL GAS ADAPTOR SYSTEM FOR AUTOMOBILES

This invention relates generally to the automobile industry, and has to do particularly with a natural gas adaptor system for automobiles originally constructed to run on gasoline.

BACKGROUND OF THIS INVENTION

As is well known, the great majority of internal combustion vehicles currently in use burn liquid gasoline to obtain motive power. In order to burn the gasoline, the same must be atomized and mixed with air in a carburetor. The mixture of atomized gasoline and air is then fed to the cylinders, where it burns rapidly as an explosive mixture.

Because of incomplete combustion and certain impurities in gasoline, the problem of emissions for gasoline-burning automobiles has become a serious one.

One approach to reducing noxious emissions from internal combustion engines is to burn a gaseous fuel, like natural gas, instead of gasoline. With natural gas, the mixture with air can be made relatively complete, due to the fact that two gases are being mixed, rather than an atomized liquid and a gas. Also, natural gas as it comes from the well can be treated to remove unwanted components, so that the burning is extremely clean, compared to gasoline.

Other factors also weigh in favour of using natural gas rather than gasoline. One of these factors has to do with cost. At the present time, the cost of using natural gas for automotive fuel, on a dollars per mile basis, is approximately one half of that of gasoline. Secondly, particularly in Canada and the United States, the supply of natural gas is relatively abundant from domestic wells. If all North American automobiles were converted to burn natural gas, dependence on off-shore oil imports would be greatly reduced.

Yet another advantage for natural gas as a fuel for automobiles is its safety feature. Because it is a gas, and because it is lighter than air, any leakage will result in the gas rising and dissipating. By contrast, gasoline or propane would puddle and build up a hazard. Furthermore, it takes a temperature of 700° C. or better to ignite natural gas, whereas gasoline ignites at a much lower temperature (450° C.), as does propane. Additionally, it takes specific natural gas to air pecentages for combustion—four to fourteen. Because this is a narrower range than that for gasoline, the likelihood of combustion other than in the engine itself is reduced.

From a pollution point of view, it has been estimated that natural gas cuts pollution by about 90% compared with gasoline. As mentioned previously, this is partly due to the fact that the gasoline droplets resulting from atomization mix imperfectly with air in the carburetor and tend to separate. By contrast, natural gas, which is already in gaseous form, mixes much more thoroughly with air and cannot be separated from it. Thus, natural gas burns more completely, more efficiently and more cleanly. Furthermore, natural gas contains no lead, as do several of the gasoline blends, and produces no particulate matter when it is burned. Additionally, natural gas produces less carbon monoxide than gasoline. Natural gas produces virtually no hydrocarbons that the sun can turn into smog.

In 1982, at least 400,000 cars and trucks around the world were already using natural gas for power. Typically, the natural gas is compressed to a pressure of around 3,000 psi and stored in one or more pressure storage tanks in the vehicle. The storage tanks are standard high-pressure tanks of the kind that helium, argon and other specialty gases are stored in. In general terms, the natural gas is bled from the tanks and passes to a pressure regulator that brings the gas pressure in the tanks down to the proper pressure for the mixer. The mixer is a unit which sits above the carburetor (in the case of a system which can burn either gasoline or natural gas) or above the throttle valve leading to the intake manifold (in the case of a vehicle burning natural gas only). The mixer is adapted to mix the appropriate quantity of air with the natural gas prior to entering the intake manifold. The mixture is then burned in the cylinders in exactly the same way as the atomized gasoline and air mixture is typically burned in a standard automobile.

The above operational system is well known. The present invention concerns more the matter of filling the storage tanks. At present, vehicles equipped with a natural gas combustion system can drive into a service station equipped with the appropriate high pressure cascade tanks, and can be filled from zero pressure to maximum pressure (3,000 psi or thereabouts) in about five minutes. However, at the present time there are only a few service stations so equipped, and it would be of advantage to be able to fill the tanks from the low pressure natural gas available in the pipes that bring natural gas to homes for heating purposes. However, the natural gas in the house lines is only a few psi above atmospheric, and needs to be compressed in order to allow the storage tanks to be filled. It is already known to provide a small compressor which is operated by an electrical motor connected to the house mains. The compressor would typically be mounted in the garage, and the automobile can be charged overnight (12 to 14 hours) using this conventional compressor.

However, for automobiles which are used continuously, such as taxis, a single fill of the storage tanks may not be sufficient for a full day's use, and if the high pressure cascade fill-up stations are not available, a problem arises in connection with refuelling.

GENERAL DESCRIPTION OF THIS INVENTION

Accordingly, it is an aspect of this invention to provide a system which is contained within the automobile and which allows the automobile to re-fuel from a low-pressure natural gas line in a much shorter space of time, typically from 12 to 15 minutes. In this system, the car engine is adapted for dual operation—gasoline and natural gas—and is set at fast idle while burning gasoline, the power from the engine being fed to a compressor which has the capacity to fill the tanks within the designated time.

More specifically, this invention provides a gas charging system for a vehicle having an internal combustion engine adapted to run on gasoline or on natural gas, as well as a gasoline tank adapted to feed gasoline through a carburetor to the engine. The charging system includes storage means adapted to store natural gas under a given storage pressure, and delivery means through which natural gas can be delivered from the storage means through an air-mixing means to the carburetor. A compressor is provided, and is adapted to receive low-pressure natural gas and to compress it up to the storage pressure. Drive means allow the engine to drive the compressor, and conduit means extend from the output of the compressor to the storage means.

This invention further provides a method having to do with the operation of a vehicle which has an internal combustion engine adapted to run on gasoline or on natural gas, and a gasoline tank adapted to feed the gasoline through a carburetor to the engine. The vehicle also includes storage means adapted to store natural gas under a given storage pressure. The method allows the storage means to be charged with natural gas, and includes idling the engine on gasoline to drive a compressor which receives low-pressure natural gas and compresses it up to storage pressure, and delivering the pressurized gas to the storage means.

GENERAL DESCRIPTION OF THE DRAWINGS

One embodiment of this invention is illustrated in the accompanying drawings, in which like numerals denote like parts throughout the several views, and in which:

FIG. 1 is a schematic elevational view of an automobile in which the system of this invention is installed; and FIG. 2 is a schematic layout of the re-fuelling portion of the system.

DETAILED DESCRIPTION OF THE DRAWINGS

Figure 1:
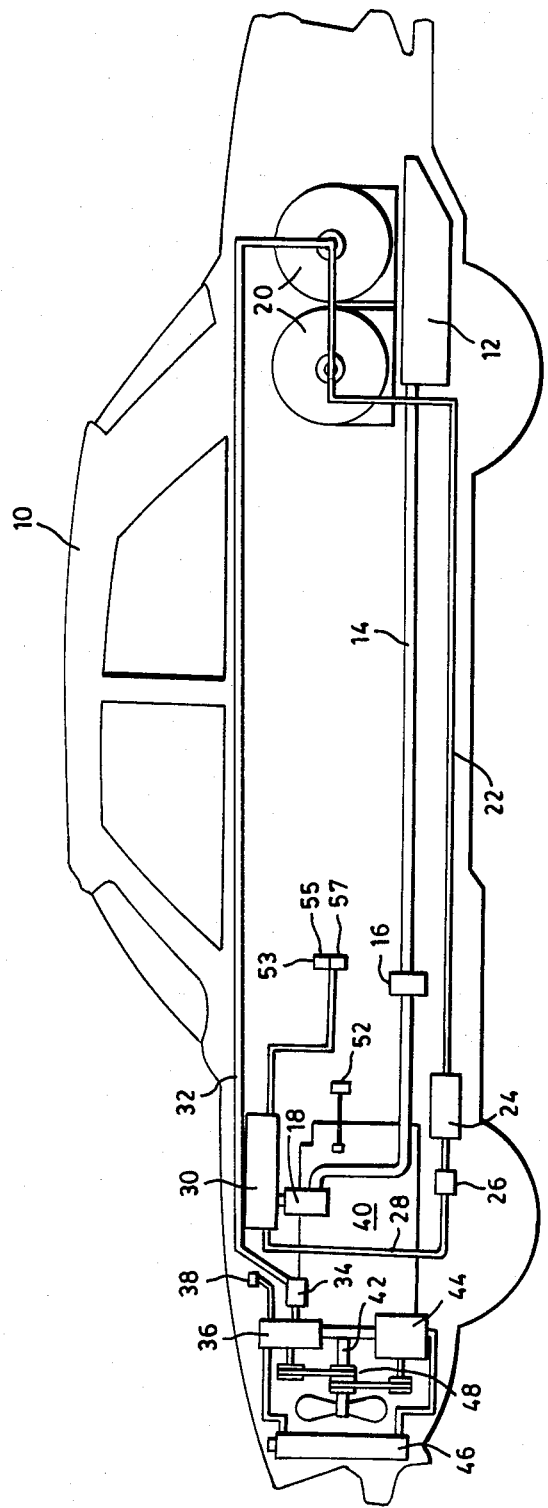
Figure 2:
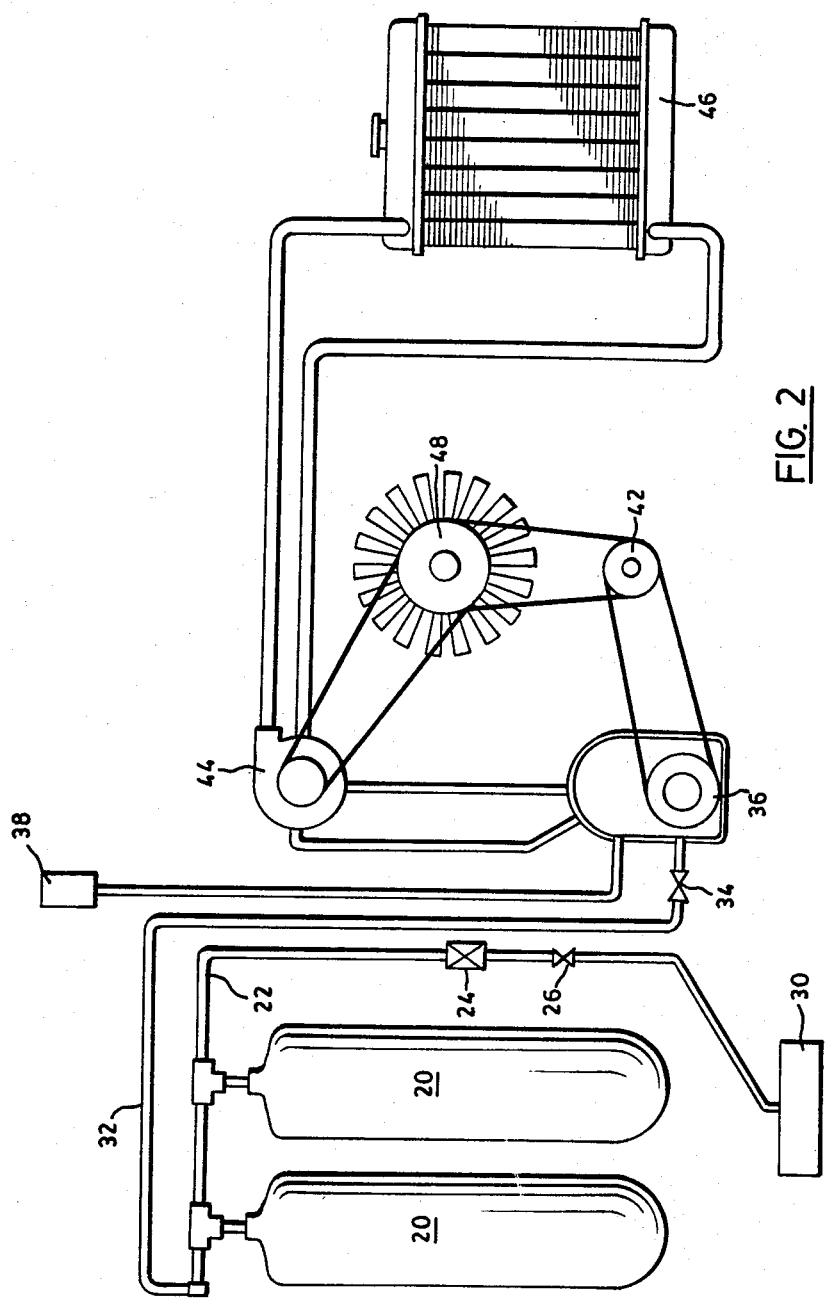

Attention is first directed to FIG. 1, which shows an automobile 10 which includes a conventional gasoline tank 12 adapted to feed gasoline along a fuel line 14 through a gasoline shut-off solenoid valve 16 to a gasoline carburetor 18. The carburetor is connected through a throttle valve to the intake manifold of the engine, in the conventional way.

The numeral 20 designates the natural gas storage cylinders. These may be of rugged magnesium steel, and adapted to hold about 300 to 400 cubic feet (8.7 to 11.6 cubic meters) of natural gas. This is the equivalent of about 2.1 to 2.8 gallons (9.6 to 12.8 liters) of gasoline per tank. Generally, 140 cubic feet of natural gas equals one gallon of gasoline. Most cars can be fitted with two such tanks, and some are large enough to be fitted with three. Trucks and vans can be fitted with from two to four tanks.

From the storage cylinders 20, a high pressure gas line 22 passes to a pressure regulator assembly 24, the effect of which is bring the high gas pressure in the cylinders 20 down to the proper pressure for mixing with air. Downstream of the pressure regulator assembly 24 is a solenoid valve 26, which is adapted to stop the natural gas flow when the car is running on gasoline. From the solenoid valve 26, a downstream line 28 leads to the gas/air mixer 30 which has an outlet connected to the inlet of the carburetor 18. Usually, the mixer 30 would replace an air cleaner. Its function is to blend the natural gas with air for combustion, and to filter the air for gasoline operation.

A neutral lock switch 34 is adapted to prevent gear engagement during refuelling. Connected to the lock switch 34 is a compressor 36 which receives low pressure natural gas through a charging point 38 adapted to be connected to the low pressure lines which, for example, feed natural gas to houses, and to deliver the natural gas at higher pressure to a line 32, which separately feeds the storage cylinders 20.

The automobile engine is shown at 40, and has a main shaft 42 projecting forwardly, from which two belt drives provide power to the compressor 36 and also to a water pump 44 which is adapted to provide coolant to the compressor 36. The water pump 44 and the passageways in the compressor 36 can be connected in series with the cooling passageways of the engine 40, and the general circuit will include the radiator 46 of the automobile. The fan drive and pulleys to power the compressor 36 and water pump 44 are identified by the numeral 48 in FIG. 1.

In FIG. 1 a vacuum shut-off switch is shown at 52, and the dashboard 53 is provided with a fuel selector 55 and a fuel gauge 57 for the natural gas, the fuel gauge being in reality a pressure gauge since the quantity of fuel in the cylinders 20 will always be proportional to the pressure.

It is to be understood that, during refuelling, the engine 40 operates on fast idle for about 15 minutes.

In the preferred embodiment, a magnetic clutch is interposed between the engine 40 and the compressor 36. A preferred compressor would be one which is a four stage, four cylinder compressor adapted to run at about 3500 rpm, with a 7 cubic inch displacement. The horsepower rating would be about 22 hp. The compressor would be adapted to take incoming natural gas at about 5 psi above atmospheric, and to compress it to about 3,500 psi.

It is to be understood that, while it is contemplated to carry out this invention utilizing storage tanks capable of holding natural gas pressures up to 3,000 psi or more, the actual operating pressure level of the tanks is not to be considered a limiting factor. The essence of this invention can be utilized regardless of how high or low the tank pressure may be, so long as some compressing means is required to raise the line pressure to the storage pressure. Such storage pressure may be as low as 1,000 psi or only several hundred psi.

While a particular embodiment of this invention has been illustrated in the accompanying drawings and described hereinabove, it will be apparent to those skilled in the art that changes and modifications may be made therein, without departing from the essence of this invention, as set forth in the appended claims.

I claim:

1. In a vehicle having an internal combustion engine adapted to run both on gasoline and on natural gas, and a gasoline tank adapted to feed gasoline through a carburetor to the engine, a gas charging system comprising:

storage means adapted to store natural gas under a given storage pressure, delivery means through which natural gas can be delivered from the storage means through an air-mixing means to the carburetor.

a compressor adapted to receive low-pressure natural gas and to compress it up to the storage pressure, drive and fuel delivery means by which the engine directly drives the compressor while the engine is being fuelled by gasoline from the gasoline tank, and conduit means from the output of the compressor to the storage means.

2. The invention claimed in claim 1, in which said delivery means comprises a pressure regulator assembly, a first delivery conduit from the storage means to the pressure regulator assembly, and a second delivery conduit from said assembly to the carburetor.

3. The invention claimed in claim 2, in which said second delivery conduit has valve means for halting gas flow therealong when the engine is operating on gasoline.

4. The invention claimed in claim 1, which further includes a pump delivering coolant liquid to the compressor, and further drive means by which the engine drives the pump.

5. The invention claimed in claim 4, in which the pump and the compressor are in series with cooling liquid passageways in the engine.

6. The invention claimed in claim 1, in which said air mixing means also filters air for gasoline operation.

7. In the operation of a vehicle having an internal combustion engine adapted to run both on gasoline and on natural gas, a gasoline tank adapted to feed gasoline through a carburettor to the engine, and storage means adapted to store natural gas under a given storage pressure, a method of charging the storage means with natural gas which includes idling the engine on gasoline to directly drive a compressor which receives low-pressure natural gas and compresses it up to storage pressure, and delivering the pressurized gas to the storage means.

8. The method claimed in claim 7, which further includes causing the idling engine to drive a pump to deliver coolant liquid to the compressor.

9. The method claimed in claim 8, in which the pump and the compressor are in series with cooling liquid passageways in the engine.

* * * * *